CLAMP CIRCUIT WITH A SHUNT UNILATERAL DISCHARGE PATH

Filed Nov. 25, 1960

INVENTORS
CHARLES A. BOGDAN, JR.
FREDRIC C. FITZGERALD
RICHARD W. JONES
BY Paul D. Cunningham
ATTORNEY United States Patent Office 3,159,751
Patented Dec. 1, 1964

3,159,751

CLAMP CIRCUIT WITH A SHUNT UNILATERAL DISCHARGE PATH

Charles A. Bogdan, Jr., Vestal, Fredric C. Fitzgerald, Endicott, and Richard W. Jones, Apalachin, N.Y., assignors to International Business Machines Corporation, New York, N.Y., a corporation of New York Filed Nov. 25, 1960, Ser. No. 71,742
10 Claims. (Cl. 307—88.5)

Figure 1:
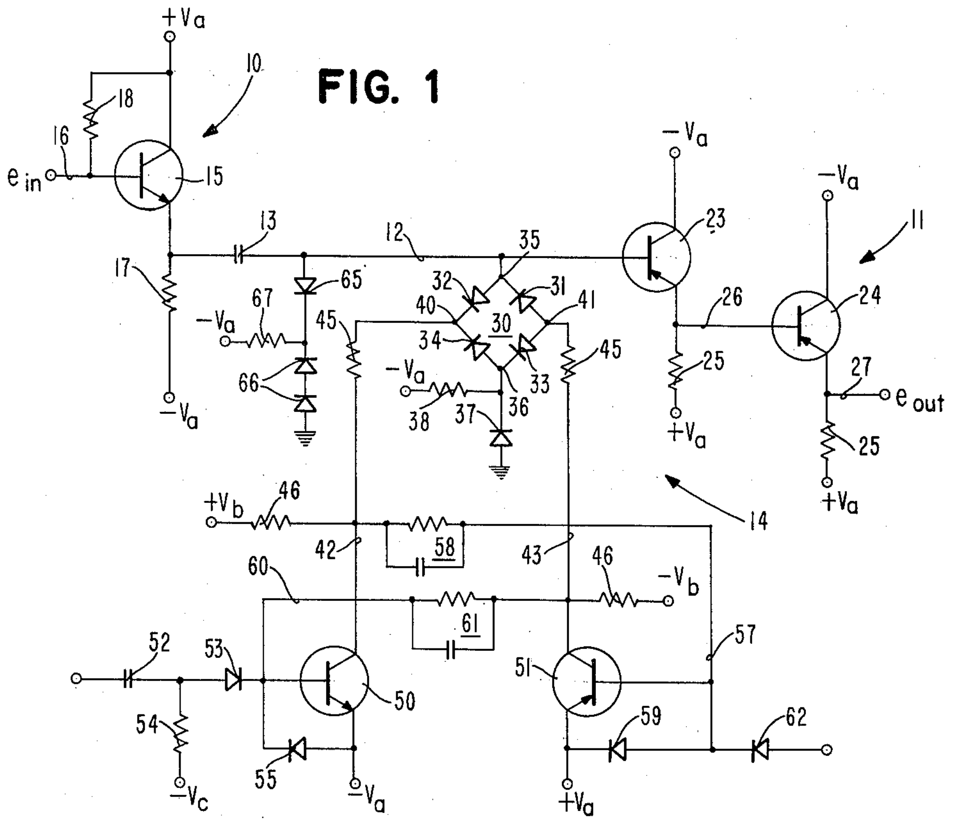

The present invention relates generally to the electronic arts and more particularly to the provision of a highly improved clamp circuit for periodically referencing a conductor to a predetermined potential level.

Clamp circuits of various types are well known and widely employed in the arts. A synchronous clamp, for example, may be used in the video amplifier portion of television apparatus. After each electronic scan there is provided a period where no video input signals are present and clamping is accomplished during this time interval. However, in many applications it is desirable to clamp a conductor to a reference potential in the presence of input signals. This may be done when the electronic beam of the display device is being returned in preparation for another scan and is effectively blanked.

Certain circuits use coupling capacitors to interconnect the various stages thereof. In transistor circuits the value of such a coupling capacitor is usually relatively large due to the inherent low impedance characteristics of conducting transistors. This is especially true where a low frequency response is desired.

The problem of clamping in the presence of input signals, and especially where a large coupling capacitor is employed, is not successfully solved by the use of conventional prior art clamp circuits. The coupling capacitor is disposed to the input side of the clamp circuit and, when the clamp circuit is closed to tie the conductor to a reference potential, the capacitor will be charged toward the value of an input signal occurring during clamping time. After the input signal disappears, the voltage on the capacitor immediately begins to discharge through the closed clamp at a rate dependent upon the value of the capacitor, the source impedance and the effective impedance of the closed clamp. If the clamp circuit is opened before the voltage on the capacitor has been completely dissipated, the residual voltage on the capacitor will cause an undesirable shift in the voltage level of the conductor from the reference voltage to which it has been clamped.

Briefly, the present invention relates to an electronic circuit which comprises clamp means for periodically referencing a conductor to a predetermined potential in the presence of input signals on the conductor wherein a unidirectional discharge path is provided in shunting relation with respect to the clamp means. This discharge path prevents any residual voltage appearing on the coupling capacitor when the clamp means is opened from causing a sustained voltage shift on the conductor. In the disclosed embodiment the discharge path is provided by a rectifying or steering device, a diode, for example, properly orientated with respect to the polarity of the input signals. This diode has a predetermined voltage drop thereacross and compensating circuit means are provided to insure that the capacitor is discharged to the reference potential. The unidirectional discharge path also serves as a portion of the circuit for supplying base current to the transistor stage referenced to the predetermined potential by the clamp means. This prevents the base current from charging the coupling capacitor when input signals are not present and the clamp means is open.

It is the primary or ultimate object of the present invention to provide a clamp circuit wherein the voltage level on a conductor which is clamped to a reference potential does not permanently shift when the clamp is opened. The voltage level on the output conductor will not be materially affected even though input signals have charged the coupling capacitor immediately prior to the opening on the clamp.

Another object of this invention is to provide a clamp circuit wherein a discharge path is connected in shunting relation with the switch means to quickly discharge any voltage across the coupling capacitor when the clamp is opened. A diode is utilized to define this discharge path as will be hereinafter more fully set forth.

A further object of the invention is to provide a clamp circuit having a discharge path in parallel with the clamp means wherein means are provided for compensating for any voltage drop occurring across the components of this path. The conductor and the coupling capacitor are both referenced to the same predetermined potential and the voltage on the conductor is not effectively shifted.

A further object of the invention is to provide a clamp circuit wherein the discharge path also serves as a portion of the circuit means supplying base current to the transistor driven by signals appearing on the conductor. This arrangement prevents the base current from reversely charging the coupling capacitor when the clamp is open and no input signals are present.

A still further object of this invention is to provide a clamp circuit of the type above described which is characterized by its extreme simplicity in construction and operation, reliability and low cost.

The foregoing and other objects, features and advantages of the invention will be apparent from the following more particular description of a preferred embodiment of the invention, as illustrated in the accompanying drawings.

Figure 2:
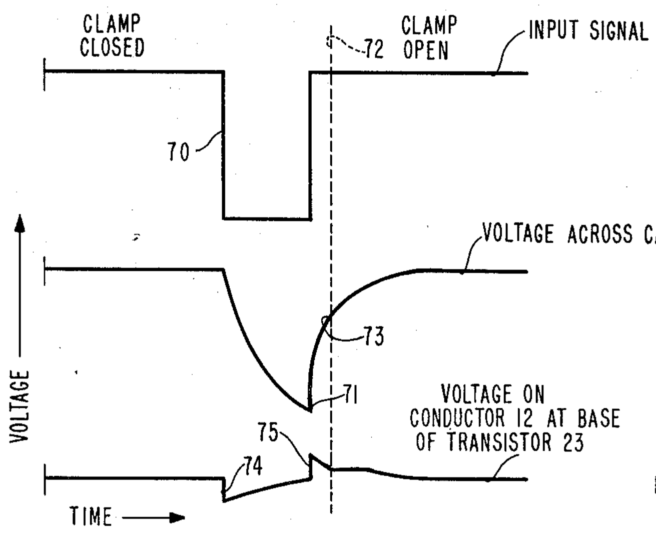

In the drawings:

FIG. 1 is a schematic circuit diagram of an electronic clamp embodying the teachings of the invention; and FIG. 2 represents a series of waveforms showing the voltages appearing at various points in the circuit of FIG. 1.

Referring now to the drawings, and initially to FIG. 1 thereof, the reference numerals 10 and 11 designate generally first and second transistor stages which are interconnected by a conductor 12 and a coupling capacitor 13. Input signals supplied to the first transistor stage 10 are transferred to the second transistor stage 11 via the coupling capacitor 13 and the conductor 12. A clamp circuit 14 is provided for referencing the conductor 12 and the second transistor stage 11 to a predetermined potential level. This clamp circuit is adapted to clamp in the presence of input signals on the conductor 12 and to prevent undesirable shifts in the voltage level on this conductor when the clamp circuit is opened.

The first transistor stage 10 comprises an NPN transistor 15. Negative input signals $e_{in}$ are supplied to the base of this transistor over input conductor 16. The collector of transistor 15 is directly coupled to a positive terminal of a source of decoupled direct current voltage $V_a$, while the emitter is connected to a negative terminal of the voltage source $V_a$ by a resistor 17. A resistor 18 is disposed between the base and the collector of transistor 15 and serves to provide bias current to the base thereof. Application of negative input signals over the input conductor 16 to the base of transistor 15 will result in the appearance of corresponding negative signals on the conductor 12. The transistor 15 is connected in emitter follower relation and the first transistor stage provides a relatively low output impedance when looking back toward this stage from the conductor 12.

If the clamp circuit 14 is open, the negative signals appearing on the conductor 12 will be applied to the second transistor stage 11. A pair of PNP transistors 23 and 24 are connected in compounded emitter follower relation to provide the second stage with a relative high input impedance when looking into this stage from the conductor 12. Each of the transistors 23 and 24 has its collector directly connected to a negative terminal of the voltage source $V_a$ and its emitter is referenced to a positive terminal of the source $V_a$ through a resistor 25. The base of transistor 23 is connected directly to conductor 12, while the base of transistor 24 is connected by conductor 26 to the emitter of transistor 23. This arrangement is such that when the clamp circuit 14 is open and negative input signals appear on conductor 12 from the first transistor stage 10, corresponding output signals will appear on an output conductor 27 leading from the emitter of transistor 24.

The value of capacitor 13 is selected to provide the desired low frequency response for the circuit and depends upon the impedance value of the conducting second transistor stage. Although, as mentioned previously, the input impedance of the second transistor stage is relatively large, the value of capacitor 13 will also be large since transistors, even when connected in compounded emitter follower relation as shown, are characterized by their low input impedances when conducting.

The clamp circuit 14 comprises a diode bridge 30 having diodes 31–34 oriented in the legs thereof in the manner shown. One terminal 35 of the diode bridge 30 is connected to the conductor 12 while the opposite terminal 36 is maintained at a negative voltage equal to the voltage drop across the diode 37. This latter diode is maintained conductive and is connected in series relation with a resistor 38 between ground and a negative terminal of the voltage source $V_a$. If, for example, the voltage at the negative terminal of voltage source $V_a$ is minus nine volts, and six-tenths of a volt drop appears across the diode 37, then the terminal 36 of diode bridge 30 will be maintained at a voltage of minus six-tenths of a volt.

The other two terminals 40 and 41 of the diode bridge are connected to opposite terminals of a direct current voltage source $V_b$ by the conductors 42 and 43 leading from these terminals and pairs of series related resistors 45 and 46. When the voltages $V_b$ minus the voltage drops across resistors 46 are impressed on the terminals 40 and 41 of the diode bridge with the polarities as indicated, the diodes 31–34 are back biased and nonconducting. The clamp circuit is open and conductor 12 is effectively isolated from the reference potential at terminal 36. The diode bridge appears as a very high impedance element when looking at the terminals 35 and 36 at this time.

However, if the voltage at terminal 41 is made sufficiently positive with respect to the voltage at terminal 40, the diodes 31–34 will be forward biased. Equal currents will flow through the matched pairs 31, 32 and 33, 34 of the diodes. The clamp circuit will be closed and conductor 12 and terminal 35 will be referenced or clamped to the potential lever at terminal 36. The diode bridge appears as a very low impedance element when looking at the terminals 35 and 36 at this time.

The circuit for accomplishing the above mentioned change of voltages across the terminals 40 and 41 of the diode bridge 30 comprises a pair of transistors 50 and 51 of the opposite conductivity type. The transistor 50 is shown as being of the NPN type and input or triggering signals are supplied to the base thereof through an input capacitor 52 and isolating diode 53. A resistor 54 is connected between a negative terminal of direct current voltage source $V_c$ and diode 53 for referencing purposes.

The collector of transistor 50 is connected by conductor 42 and resistor 46 to the positive terminal of voltage source $V_b$, while the emitter of this transistor is connected to a negative terminal of voltage source $V_a$. A biasing diode 55 is connected between the emitter and base of transistor 50 with a polarity such that a small biasing current sufficient to maintain the transistor normally nonconducting flows therethrough.

The collector of transistor 50 is also connected by conductor 57 and a parallel resistor-capacitor network 58 to the base of PNP type transistor 51. The emitter of transistor 51 is connected to a positive terminal of the source $V_a$ and a diode 59 is disposed between the base and emitter to permit the flow of biasing current sufficient to maintain the transistor normally nonconductive. The collector of transistor 51 is joined to the negative terminal of voltage source $V_b$ by conductor 43 and resistor 46. This collector is also in communication with the base of transistor 50 via conductor 60 and parallel resistor-capacitor network 61. Pulses are adapted to be supplied to the base of transistor 51 through isolating diode 62.

In operation, the transistors 50 and 51 are normally nonconducting whereby the voltages $V_b$ minus the voltage drops across resistors 46 are impressed on the terminals 40 and 41 of the diode bridge 30 to back bias the diodes thereof. The small voltage drops across the resistors 46 are due to the bias currents flowing through resistor-capacitor networks 58 and 61 to maintain the transistors 50 and 51 nonconductive. A positive spike or signal is supplied to the base of transistor 50 at an appropriate time—during blanking in television apparatus, for example—and causes the same to conduct. The collector of this transistor is caused to fall to the value of the negative terminal of the voltage source $V_a$. This voltage drop results in a negative going signal on conductor 57 which is coupled by resistor-capacitor network 58 to the base of transistor 51. The diode 59 is back biased and transistor 51 is rendered conductive.

The collector of transistor 51 rises to the positive value of $V_a$ and a positive signal on conductor 60 is coupled by resistor-capacitor network 61 to the base of transistor 50 to insure that the latter is maintained conductive. The voltage source is effectively connected across a series circuit comprising the conducting transistors 50 and 51, the resistors 45 and the diode bridge 30. The balanced pairs of diodes in the bridge 30 are enabled and the conductor 12 is referenced to the potential appearing at the terminal 36. The clamp circuit 14 is closed at this time and presents a low impedance path.

To open the clamp circuit, a positive pulse is supplied to the base of transistor 51 through diode 62 which forward biases the diode 59 and renders this transistor nonconductive. The resultant negative going signal on conductor 60 renders the transistor 50 nonconductive and the positive going signal on conductor 57 tends to drive transistor 51 further into its nonconductive state. With both transistors 50 and 51 de-energized, the voltage $V_b$ is again effectively connected across the terminals 40 and 41 of the diode bridge 30. The clamp circuit is now open and conductor 12 is isolated from terminal 36 of the bridge.

The portion of the circuit comprising transistors 50 and 51 is advantageously employed in the present application due to the positive, accurate and reliable nature thereof. For those desiring more detailed information concerning the same, reference should be made to the co-pending United States patent application of Gerald D. Brode and Thomas D. Ward, Serial No. 39,600, filed June 29, 1960, and entitled "Monostable Trigger," which is assigned to the assignee of the present invention.

Connected to the conductor 12 between the coupling capacitor 13 and the second transistor stage 11 is a diode 65 oriented as shown. The other side of the diode 65 is maintained at a predetermined potential level by a circuit comprising a pair of diodes 66 and a resistor 67 connected in series between ground and a negative terminal of the voltage source $V_a$. The diodes 66 are maintained conductive at all times whereby if these diodes have the same potential drop as the diode 37—six-tenths of a volt per diode—the lower side of the diode 65 will be at a potential of minus one and two-tenths volts. The diode 65 also has a drop of six-tenths of a volt when conducting so that, in essence, the coupling capacitor 13 is effectively clamped to a potential level of minus six-tenths of a volt.

The above circuitry compensates for the voltage drop taking place across the component in the unidirectional discharge path connected in generally parallel relation with the switch means defined by the diode bridge 30. However, it should be understood that any other type of compensating means may be employed. For example, the circuit comprising resistor 67 and diodes 66 and/or the circuit comprising resistor 38 and diode 37 may be replaced with an adjustable voltage source which would be adjusted so that the conductor 12 is maintained at the desired voltage level by either clamp means. Also, one of the diodes 66 and the diode 37 may be removed with substantially the same results. The disclosed arrangement employing a plurality of diodes is advantageous since all of these elements will be operated at approximately the same points on their characteristic curves. Temperature stability is provided since all of the diodes will be equally affected by temperature changes.

Considering now the overall operation of the apparatus above described, it will be assumed that the clamp circuit is initially closed—the transistors 50 and 51 are conducting, the diodes 31–34 are forward biased and the terminal 35 is tied to the potential value of terminal 36. The conductor 12 will therefore be at the potential of the terminal 36.

If a negative input signal, such as shown at 70 in FIG. 2 of the drawing, occurs when the clamp is closed, the coupling capacitor 13 will be charged to the value of the input signal with the left terminal thereof assuming a negative polarity as represented at 71 in the second waveform shown in FIG. 2. As soon as the input signal disappears, the capacitor will begin to discharge through the relatively low impedance of the closed clamp appearing across terminals 35 and 36 of the diode bridge 30. The diode bridge has a relatively low impedance at this time when compared to the impedance of the shunting conducting path defined by diode 65.

A positive control signal may be applied to the base of transistor 51 before the voltage on capacitor 13 has completely discharged whereby the clamp is opened and the terminals 35 and 36 of the diode bridge 30 appear as a very high impedance. The switching of the clamp from closed to open is represented by the broken line 72 in FIG. 2. In conventional clamp circuits the residual voltage 73 on capacitor 13 would provide an undesirable and sustained voltage shift on the conductor 12 and the base of transistor 23 when the clamp is opened.

In the present instance, however, the residual voltage on the capacitor 13 enables the diode 65 to provide a low impedance unidirectional discharge path for dissipating this voltage. The discharge path is connected in generally parallel relation with respect to open clamp. The effective impedance of the parallel connected low impedance discharge path and the high impedance open clamp is quite low whereby the residual voltage on the capacitor 13 is quickly discharged.

When the input signal is applied a very small negative spike 74 does appear on conductor 12. A small positive spike 75 also appears when the diode 65 is enabled. However, the magnitude of these spikes is quite small relative to the magnitude of the input signal and no effective voltage shift occurs on conductor 12.

The situation represented by the waveforms of FIG. 2 is only one of many possibilities. For example, the input signal may still be present when the clamp is opened. In all of these cases the voltage on the coupling capacitor 13 is quickly discharged to prevent a significant voltage shift on conductor 12. It should be noted that the time base for the waveforms shown in FIG. 2 represents only a very small percentage of the total sweep and clamp times usually employed in video display apparatus.

It will be noted that the discharge path and the clamp circuit use diodes to perform the clamping and switching functions. These elements are low in cost and the tolerances on the operating characteristics thereof are quite stable which make them ideally adapted for use in the present application.

The discharge path comprising diode 65 also provides a means for supplying base current to the transistor 23. Thus, when the clamp circuit is open and no input signals appear on conductor 12, the base current flows from the positive terminal of voltage source $V_a$, through resistor 25, across the emitter-base junction of transistor 23, and through conductor 12 and diode 65 to the negative potential appearing at the lower end of this diode. The arrangement is such that the capacitor 13 will not be reversely charged by the base current and cause a shift of the voltage level on conductor 12. During the time that the clamp is closed, the base current flows therethrough rather than through the diode 65.

It should now be apparent that the objects initially set forth have been accomplished. Of particular importance is the arrangement employing a unidirectional discharge path in combination with clamp means to prevent an undesirable voltage shift on the conductor being clamped. While the circuit disclosed herein is utilized in connection with negative input signals, it should be understood that a circuit operating on positive input signals may be designed. In this case the polarity of the diode in the discharge path would be reversed. Also, any clamp circuit having the ability of referencing the conductor to a potential level at predetermined times may be used in place of the one disclosed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electronic clamp for use in combination with a first transistor stage, means to supply input signals to said first transistor stage, a second transistor stage, and a conductor and coupling capacitor interconnecting said first and second stages comprising: a source of reference potential, switch means interconnecting said source of reference potential with said conductor at a point between said capacitor and said second transistor stage, said switch means appearing as a high impedance element when open and as a low impedance element when closed, means to periodically actuate said switch means, a unidirectional low impedance discharge path connected in generally parallel relation with respect to said switch means, said discharge path being connected to said conductor between said capacitor and said second transistor stage, and said discharge path dissipating any residual voltage on said capacitor when said switch means is opened.

2. Apparatus according to claim 1 further characterized in that said discharge path comprises a diode, and means to compensate for the voltage drop across said diode, and said means to compensate comprising a voltage equal to the voltage drop across said diode.

3. Apparatus according to claim 1 further characterized in that said second stage comprises a transistor having a base and a pair of terminals, said base being connected to said conductor, means to impress a voltage source across said terminals, and said conductor and said discharge path providing a circuit for the base current of said transistor in the absence of input signals when said switch means is open.

4. An electronic clamp for use with a circuit comprising a driven stage having a relatively low input impedance, a conductor leading to said driven stage, a coupling capacitor connected to said conductor, and means to supply input signals to said conductor comprising: a point at a predetermined reference potential, switch means interconnecting said point with said conductor intermediate said driven stage and said coupling capacitor, said switch means appearing as a low impedance element when closed and a high impedance element when open, means to actuate said switch means, a low impedance discharge path, means for effectively connecting said low impedance discharge path in generally parallel relation with respect to said switch means when the latter is opened, and said discharge path dissipating any residual voltage on said coupling capacitor.

5. Apparatus according to claim 4 further characterized in that said driven stage comprises a transistor having a base and a pair of terminals, said base being connected to said conductor, means to impress a potential difference across said terminals, and said conductor and said discharge path providing a circuit for the base current of said transistor when said switch means is open.

6. In combination with a conductor having a coupling capacitor therein, a clamp for use in referencing said conductor to a predetermined potential level comprising a point at said predetermined potential level, switch means interconnecting said point and said conductor, said switch means appearing as a high impedance element when open and a low impedance element when closed, means to actuate said switch means, a low impedance path, means to effectively connect said low impedance path in generally parallel relation to said switch means when the latter is opened, and said path providing a discharge path for any residual voltage on said capacitor.

7. Apparatus according to claim 6 further comprising means to compensate for the voltage drop across said discharge impedance path to prevent a shift of the potential level on said conductor, and said means to compensate comprising a voltage equal to the voltage drop across said discharge path.

8. Apparatus according to claim 6 further comprising a source of potential for said point, said source of potential comprising a diode defining a voltage level, a second source of potential for said discharge path, said second source of potential comprising a pair of series connected diodes defining a voltage level, and said diodes being operated at substantially the same point on their characteristic curves.

9. The combination comprising a driven circuit stage having a relatively low input impedance, a conductor leading to said driven stage, a coupling capacitor connected to said conductor, means to supply input signals to said conductor, a point at a predetermined reference potential, switch means interconnecting said point with said conductor intermediate said driven stage and said coupling capacitor, said switch means appearing as a low impedance element when closed and a high impedance element when open, means to actuate said switch means, a low impedance discharge path, means for effectively connecting said low impedance discharge path in generally parallel relation with respect to said switch means when the latter is opened, and said discharge path dissipating any residual voltage on said coupling capacitor.

10. Apparatus according to claim 9 further characterized in that said driven stage comprises a transistor having a base and a pair of terminals, said base being connected to said conductor, means to impress a potential difference across said terminals, and said conductor and said discharge path providing a circuit for the base current of said transistor when said switch means is open.

No references cited.